Figure 1:
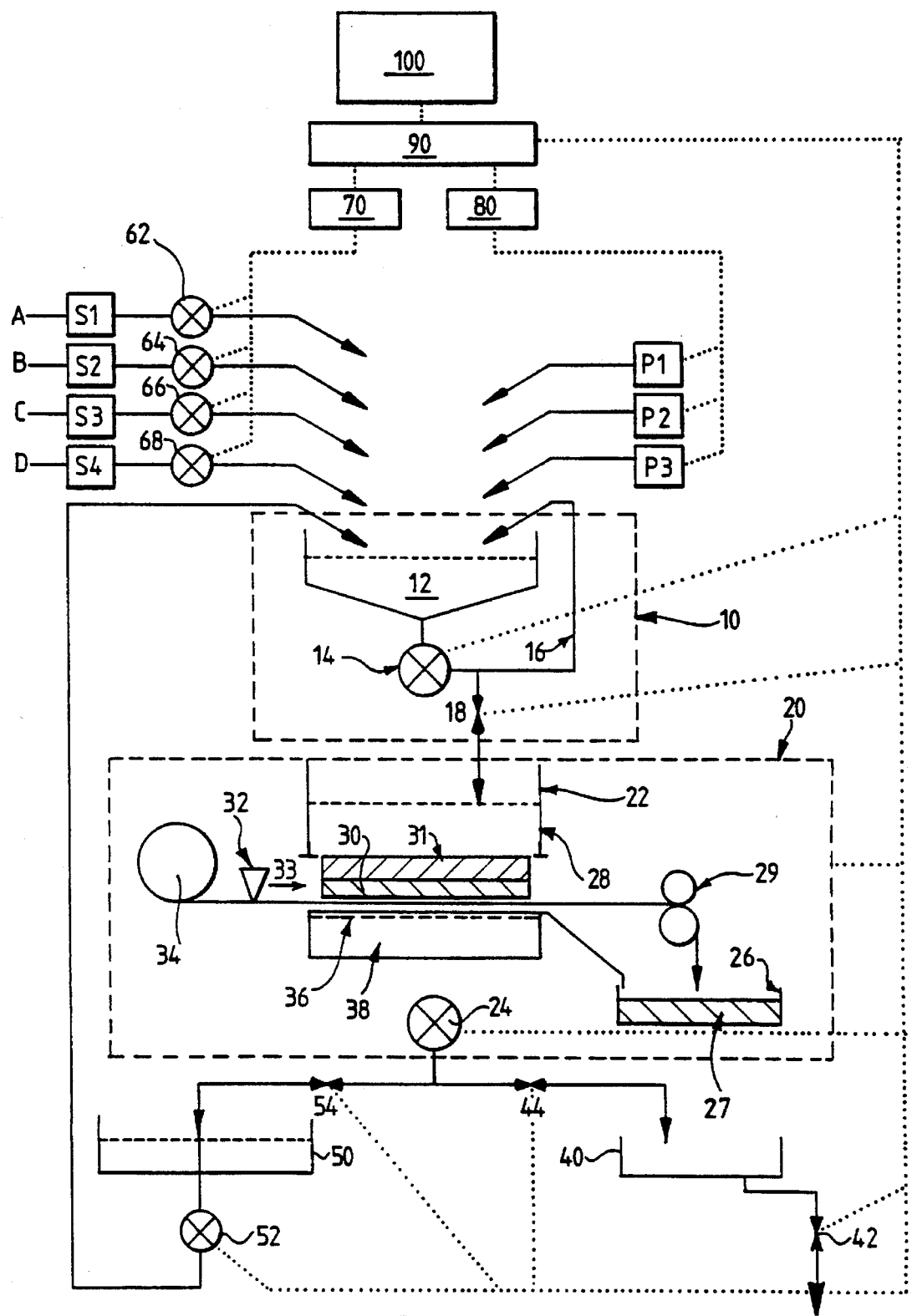

United States Patent [19]
Glover et al.

[11] Patent Number: 5,503,751
[45] Date of Patent: Apr. 2, 1996

[54] TREATMENT OF PHOTOGRAPHIC EFFLUENT

[75] Inventors: Edward C. T. S. Glover, London; Martyn S. Glover, Herts, both of United Kingdom

[73] Assignee: Eastman Kodak Company, Rochester, N.Y.

[21] Appl. No.: 190,006

[22] PCT Filed: Jul. 13, 1992

[86] PCT No.: PCT/EP92/01583

§ 371 Date: Jan. 21, 1994

§ 102(e) Date: Jan. 21, 1994

[87] PCT Pub. No.: WO94/00241

PCT Pub. Date: Jan. 6, 1994

[30] Foreign Application Priority Data

Jul. 20, 1991 [GB] United Kingdom .................... 9115799

[51] Int. Cl.[6] ....................................... C02F 1/52
[52] U.S. Cl. ............... 210/765; 210/777; 210/778
[58] Field of Search ..................... 210/138, 139, 210/140, 141, 142, 205, 206, 777, 778, 765, 712

[56] References Cited

U.S. PATENT DOCUMENTS

| | | |
|---|---|---|
| 4,329,042 | 5/1982 | Libicky et al. . |
| 4,332,687 | 6/1982 | Daignault et al. . |
| 4,465,593 | 8/1984 | Weinhoff ................................. 210/206 |
| 4,755,453 | 7/1988 | Kunda et al. . |
| 4,874,530 | 10/1989 | Kabayashi et al. ...................... 210/718 |
| 4,977,067 | 12/1990 | Yoshikawa et al. . |
| 5,211,843 | 5/1993 | Wester et al. ........................... 210/143 |

FOREIGN PATENT DOCUMENTS 0424820  5/1991  European Pat. Off. .
2157839  10/1985  United Kingdom .

*Primary Examiner*—Neil McCarthy
*Attorney, Agent, or Firm*—Nixon, Hargrave, Devans and Doyle

[57] ABSTRACT

It is known to treat the effluent resulting from photographic processing apparatus. Such treatment takes the form of either neutralization where the effluent is mixed with a neutralizing solution prior to disposal, or evaporation where the effluent is heated to form a precipitate and a concentrated liquid portion prior to disposal. However, both these techniques have disadvantages they do not account for toxic particles which may be suspended in the solutions. Described herein is apparatus in which photographic effluent can be treated to provide harmless end products which can be disposed of directly. The apparatus comprises a mixing unit (10) in which the effluent (S1) is mixed with treatment chemicals (S2, S3, S4, P1, P2, P3) and is then passed to a separation unit (20) in which the treated effluent is separated into non-toxic liquid and solid phases. A computer (100) is used to control all stages of the treatment of the effluent.

5 Claims, 1 Drawing Sheet

TREATMENT OF PHOTOGRAPHIC EFFLUENT

This invention relates to the treatment of photographic effluent.

In photographic processing, the performance of processing solutions need to be constantly maintained. This is achieved by replenishing the processing solutions in accordance with their use and also with their deterioration due to their inherent instability. During replenshment, used processing solution is discarded for disposal.

It is well known to treat used processing solution to recover useful components, for example, silver from fixing solutions prior to disposal. It is also known to treat such solutions to make them less harmful to the environment.

U.S. Pat. No. 3,978,506 discloses apparatus and method for neutralizing processing solutions. Used processing solution from at least one processing tank is discharged into a container. Neutralizing solution is added to the container in proportion to the processing solution to be neutralized, and the two solutions are mixed to achieve neutralization, the resulting neutralized fluid being discharged for disposal.

EP-A-0 315 373 discloses apparatus for the treatment of liquid waste from photographic processes. The liquid waste is heated to produce a solid portion in precipitate form and a concentrated liquid portion. The precipitate is separated from the liquid portion for disposal, and the concentrated liquid portion is recirculated for further heating and concentration prior to its disposal.

However, U.S. Pat. No. 3,978,506 has the disadvantage that there is no provision for dealing with toxic particles which may be suspended in the used processing solution. Furthermore, the precipitate produced in EP-A-0 315 373 may still present a problem for disposal.

U.S. Pat. No. 4,332,687 discloses apparatus and method for the removal of heavy metals from photographic processing waste solutions. This is achieved by first treating the solution using ozone and a peroxy compound which exhibits strong oxidizing properties to destroy the complexing agents, and then precipitating the heavy metals as insoluble hydroxides or oxides by raising the pH of the solution using a suitable caustic material, for example sodium hydroxide. Additional precipitation of the heavy metals is achieved by adding a sulphide to the alkaline solution to form insoluble heavy metal sulphides.

It is therefore an object of the present invention to provide apparatus which overcomes the problems and disadvantages of known apparatus for the treatment of photographic effluent. In particular, apparatus according to the invention is used to convert toxic photographic-waste into a harmless liquid phase which can be put down the drain, and a solid phase which can be put into a land fill.

According to one aspect of the present invention, there is provided a method of treating photographic effluent comprising the steps of:

delivering untreated photographic effluent to a mixing unit;

dispensing treatment chemicals for treating the untreated effluent into the mixing unit;

mixing the untreated effluent with the dispensed treatment chemicals in the mixing unit; and separating the mixed and treated effluent into a liquid phase and a solid phase for disposal;

characterized in that the method comprises the further step of establishing a filter bed by passing the treated effluent into a filter unit which includes a filter member, the filter bed being formed on the filter member as the treated effluent is passed therethrough.

In accordance with a second aspect of the present invention, there is provided apparatus for the treatment of photographic effluent using the method described above, the apparatus comprising:

a mixing unit for mixing photographic effluent with treatment chemicals;

delivery means for delivering untreated photographic effluent to the mixing unit;

dispensing means for dispensing treatment chemicals into the mixing unit;

a separation unit for separating the mixed and treated effluent into a liquid phase and a solid phase; and control means for controlling the delivery means, the dispensing means and the mixing unit to ensure that the treatment chemicals are correctly dispensed and mixed thoroughly with the effluent being treated;

characterized in that the separation unit comprises a filter member on which a filter bed is established using the mixed and treated effluent.

For a better understanding of the present invention, reference will now be made, by way of example only, to the accompanying drawing, the single figure of which schematically illustrates apparatus according to the present invention.

FIG. 1 shows a schematic layout of the component parts of apparatus according to the present invention. The apparatus comprises a mixing unit 10 and a separation unit 20 which are connected to one another as shown. The mixing unit 10 comprises a mixing vessel 12 in which treatment chemicals and effluent are mixed, a centrifugal pump 14 which enables the output from the mixing vessel 12 to be recirculated for further mixing through line 16, and an electrically-operated dump valve 18 which allows the treated effluent to pass to the separation unit 20.

The separation unit 20 comprises a filter unit 22, a suction pump 24 and a collection container 26. The filter unit 22 includes a cylinder or similar container 28, a filter bed 30, a scraper 32, and a supply of filtration material 34 (in this case, filter paper). The suction pump 24 removes liquid from the cylinder 28 leaving behind a residue 31. The residue 31 is put into the collection container 26 as indicated by numeral 27 (or encapsulated if necessary) prior to disposal.

The liquid extracted from the cylinder 28 by the pump 24 is then passed either to a first holding tank 40 connected to a drain (not shown) via valve 42, or to a second holding tank 50, the contents of which can be pumped up to the mixing vessel 12 by pump 52 for further mixing and treatment. The flow of the liquid phase to either holding tank 40, 50 is controlled by respective valves 44, 54.

Alternatively, the pump 24 may simply direct the liquid extracted from the cylinder 28 to a holding tank (not shown) and then on to further treatment apparatus.

In the separation unit 20, the suction pump 24 is used to reduce the filtering time under the control of the computer 100 through interface 90. In one embodiment, as shown in the Figure, the filter bed 30 works in conjunction with filter paper 34 to prevent the paper being prematurely clogged and increasing the overall filtering time, i.e. the bed 30 acts as a prefilter for the paper 34.

The cylinder 28 is movable in a vertical direction to allow the scraper 32 to wipe the precipitation left after filtration and the filter paper 34 itself into a waste container 26.

The filter bed 30 with its filtered material is transported into container 26 either by movement of scraper 32 in the direction of arrow 33, or by roller pair 29 acting on the longitudinal edges of the filter paper web. The filtered material is depicted by numeral 27 in container 26. The item 30 may be either a pre-formed 'Kieselguhr' bed or a mixture of residue 31 and filter material (for example, 'Kieselguhr').

In a preferred embodiment, the filter bed 30 comprises a fine layer of 'Kieselguhr' which is laid on top of a main filter 36 in a housing 38. The filter 36 is made of stainless steel. This provides a paperless filtration system. The liquid used to establish the filter bed 30 can either be water or treated developer solution. In the latter case, the filtering operation needs to be started for a short period of time until the filter bed is established. During this time, the filtrate is directed via valve 54 into holding tank 50. Once the bed has been established, valve 54 is closed and valve 44 is opened allowing clear liquid to pass to tank 40 and then to drain via valve 42. Liquid in tank 50 is pumped back into chamber 12 for further treatment by pump 52.

As shown in the Figure, separator 20 is in the open mode prior to scraper 32 depositing filter bed/residue 30, 31 into container 26. During the filtering operation, cylinder 28 is clamped against filter 36 of housing 38. The paper 34 may be retained between the cylinder 28 and filter 36 if required. Once filtering is complete, cylinder 28 is moved vertically upwards thus allowing scraper 32 to pass under cylinder 28 to move the filter bed 30 and residue 31 from the surface of filter 36.

If paper is present, the filter bed 30 and residue 31 can be cleared from filter 36 either using the scraper 32 or rollers 29 as described above. If no paper is present, then only the scraper 32 moves the filter bed 30 and residue 31.

The cylinder 28 and scraper 32 may be operated by a motor/cam arrangement (not shown).

In the mixing unit 12, solutions and powders are added to the effluent. The effluent is supplied from container S1 via a metering pump 62. The treatment solutions are supplied via respective containers S2, S3, S4, and their associated metering pumps 64, 66, 68. The metering pumps 62, 64, 66, 68 may be small diaphragm pumps. Similarly, treatment powders are supplied from respective containers P1, P2, P3. The addition of the effluent and treatment solutions and powders is controlled by respective timer modules 70, 80. Each timer module 70, 80 is connected to a computer 100 through the interface 90. The computer 100 also controls the operation of pumps 14, 24, 52 and valves 18, 42, 44, 54 via interface 90.

Each timer module 70, 80 may comprise a single timer unit which controls the addition of all of the solutions and powders respectively. Alternatively, each timer module 70, 80 may comprise individual timer units, each one being associated with the addition of a particular solution or powder.

Apparatus according to the present invention uses screws or augers (not shown) to dispense the powdered chemicals from their containers P1, P2, P3, and pumps 62, 64, 66, 68 to dispense the liquids into a mixing vessel 12 as shown. Naturally, means other than screws or augers may also be used to dispense the powdered chemicals. In operation, the dump valve 18 is closed, and centrifugal pump 14 returns the mixture of effluent and treatment chemicals to the mixing vessel 12 for further mixing and/or treatment. Once the treatment has been completed, the dump valve 18 is opened and the treated effluent is passed into the separation unit 20.

The effluent is treated according to the steps disclosed in WO-A-92/04660 given in Table 1 below:

TABLE 1

1 Solution A is added to solution B
2 Wait for 2 minutes
3 Add powder 1 (to mixing unit 12)
4 Wait for 2 minutes TABLE 1-continued 5 Add solution C (to mixing unit 12)
6 Wait 1 minute
7 Dump to filter unit 22 and filter
8 Dump to lower holding tank 50
9 Pump back to mixing unit 12
10 Add solution D
11 Add powders 2 and 3
12 Wait 2 minutes
13 Dump to filter unit 22 for second time (old residue still in place)
14 Filter
15 Residue 26 (and filter paper 34 if used) to waste container 27
16 Liquid waste to Drain
17 END
18 Restart at 1

In the case of a paperless filter system, a filter bed of 'Kieselguhr' has to be established as previously described prior to taking the above processing steps.

Steps 1 and 2 above may be carried out in the mixing unit 12 as shown in FIG. 1. Alternatively, these steps could be carried out in an effluent holding tank within a processing machine.

Solution A is the effluent from the machine.

Solution B is an oxidizing agent which may be inorganic or organic and may include permanganate, perchromate, persulphate, perphosphate, perborate or percarbonate, benzyl or urea peroxide but conveniently hydrogen peroxide is used, as is described in WO-A-92/04660.

Solution C is a soluble metal salt which dissolves to give an acidic solution which on the addition of an alkali produces a precipitation of hydroxide. For example, solution C may be the salt of a Group III or transition metal such as aluminium sulphate. The use of this salt is described in WO-A-92/04282.

Powder 1 is an alkaline earth or transitional metal hydroxide or any other compound slightly soluble in water to give an alkaline solution. It may be a metal hydroxide, oxide or carbonate, preferably a Group II metal hydroxide, such as zinc, cadmium, mercury, magnesium or calcium hydroxide. Use of calcium hydroxide is disclosed in WO-A-92/04660.

Powder 2 is a developer absorbing material, for example, an ionic, cationic or neutral ion exchange material or a polymeric absorbing material or carbon in a suitable form for absorbing developer, for example, activated carbon as described in WO-A-92/04660.

Powder 3 may be an diatomaceous earth or other common filtering material, for example 'Kieselguhr' or wet sawdust as described in WO-A-92/04660.

The powders and solutions are added in sufficient quantities to produce the desired effects, namely:

Solution B—to oxidize sulphite to sulphate and thiosulphate to tetrathionate;

Solution C—to make the pH of the effluent acceptable for sewering, for example, pH less than 9;

Powder 1—to provide a pH greater than 12; and

Powders 2 & 3—determined by experiment. Preferred quantities are recited in WO-A-92/04660.

The preferred compositions of the solutions and powders are given in Table 2 below:

TABLE 2

| SOLUTION | COMPOSITION | VOLUME |
|---|---|---|
| A | Effluent from machine | 100 ml ± 5% |
| B | 3% Hydrogen peroxide | 40 ml ± 10% |
| C | 10% Aluminium sulphate | 21 ml ± 10% |
| D | Used Developer or other solutions for treatment | 300 ml |

| POWDER | COMPOSITION | AMOUNT |
|---|---|---|
| 1 | Calcium Hydroxide | 3 gm ± 10% |
| 2 | Carbon | 3 gm ± 10% |
| 3 | Kieselguhr | 3 gm ± 10% |

| TIMES | | |
|---|---|---|
| T1 | 2 minutes ± 20% | |
| T2 | 2 minutes ± 20% | |

It is possible to produce a 'Kieselguhr' filter bed 30 by adding a mixture of Kieselguhr and treated developer plus activated carbon to the separation unit 20. (This renders the developer sufficiently inactive to allow it to be put down the drain.) Alternatively, other treated solutions or water (as mentioned previously) can be used to establish the filter bed. Once this has been done the tail end material can be filtered in the same manner as when a paper filter is used.

A 'Kieselguhr' filter bed can be used repeatedly until it becomes full. This can be monitored by determining the filtering time, and when this exceeds a predetermined value, the bed is ditched and a new one established as required.

Apparatus according to the present invention can be used in a minilab environment where both film and paper are being processed. Film and paper processing each produce their own effluent, and effluent from either process can be treated independently by the apparatus described above.

Each process has its own effluent or waste products. In the case of film processing, these products are developer, bleach, fixer and film stabiliser. In paper processing, these products are developer, bleach/fix and paper stabiliser.

As the apparatus according to the present invention is computer-controlled, the filter bed 30 can be established using developer solutions from either film or paper processing. Once the filter bed has been established, the waste products from either film or paper processing can then be treated as determined by the computer. In either case, the products are added to the mixing unit 12 where suitable amounts of the treatment chemicals for those waste products are added. (Different amounts of treatment chemicals are required for waste products arising from film and paper processing.)

The main advantage of this invention is that it can be used to produce a very small low cost compact effluent treatment unit which is small enough to be used in a 'minilab' installation, i.e. it is a fully automatic process which previously was carried out by hand by a skilled technician. Also, because the materials being added are under 'software' control, the process components and processing times can be altered at will (even down a modem telephone line). Therefore, all the units in the field could be updated without a visit from the service engineer.

A further extension is to use this whole apparatus to treat other forms of effluent, such as material from a chemical plating plants for example.

Other filtering agents can be used instead of Kieselguhr to form the filter bed.

Another use is that the apparatus could be used as a wet and dry chemical mixing station. All that would be needed to be added would be an accurate balance system to weigh the incoming powders and solutions.

We claim:

1. A method of treating photographic effluent comprising the steps of:

delivering a toxic untreated photographic effluent to a mixing unit;

dispensing treatment chemicals for treating the untreated effluent into the mixing unit;

mixing the untreated effluent with the dispensed treatment chemicals in the mixing unit to form a treated effluent containing precipitates; and establishing a filter bed deposited on a filtering means wherein said filtering means is capable of supporting and retaining the filter bed, said filter bed deposited on said filtering means in an amount sufficient to filter out the precipitates from the treated effluent such that the precipitates contained in the filter bed and a filtered effluent passing through the filtering means are safe for disposal without further chemical treatment and filtering;

providing the treated effluent to the filtering means; and separating the treated effluent into safely disposable liquid and solid phases without further treatment.

2. The method according to claim 1, further comprising the step of recirculating the treated effluent through the filtering means until the filter bed is fully established.

3. The method according to claim 2, further comprising the step of recirculating the treated effluent through both the mixing unit and the filtering means so that it passes through the fully established filter bed.

4. The method according to claim 1, wherein the method of treating photographic effluent is automated and capable of being used in a compact and portable on-line treatment installation.

5. The method according to claim 1, wherein the filter bed comprises materials selected from the group consisting of Kieselguhr and activated charcoal.

* * * * *